US009166718B2

(12) United States Patent
Chen et al.

(10) Patent No.: US 9,166,718 B2
(45) Date of Patent: Oct. 20, 2015

(54) DOWNLINK CONTROL INDICATION FOR A STAND-ALONE NEW CARRIER TYPE (NCT)

(71) Applicant: INTEL CORPORATION, Santa Clara, CA (US)

(72) Inventors: Xiaogang Chen, Beijing (CN); Yuan Zhu, Beijing (CN); Jong-Kae Fwu, Sunnyvale, CA (US); Kamran Etemad, Potomac, MD (US); Qinghua Li, San Ramon, CA (US); Hong He, Beijing (CN); Rui Huang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 38 days.

(21) Appl. No.: 13/784,459

(22) Filed: Mar. 4, 2013

(65) Prior Publication Data

US 2013/0301549 A1    Nov. 14, 2013

Related U.S. Application Data

(60) Provisional application No. 61/646,223, filed on May 11, 2012.

(51) Int. Cl.
*H04J 3/16* (2006.01)
*H04B 7/26* (2006.01)
(Continued)

(52) U.S. Cl.
CPC .............. *H04J 3/1694* (2013.01); *H04B 1/56* (2013.01); *H04B 7/024* (2013.01); *H04B 7/0456* (2013.01); *H04B 7/0473* (2013.01); *H04B 7/0486* (2013.01); *H04B 7/063* (2013.01); *H04B 7/065* (2013.01); *H04B 7/0632* (2013.01); *H04B 7/0639* (2013.01); *H04B 7/0647* (2013.01);
(Continued)

(58) Field of Classification Search
USPC .................... 370/252.31–252.35, 464–465
See application file for complete search history.

(56) References Cited

U.S. PATENT DOCUMENTS

| 8,737,251 B2 * | 5/2014 | Baker et al. .................... 370/252 |
| 2009/0259909 A1 * | 10/2009 | Luo ............................. 714/748 |

(Continued)

FOREIGN PATENT DOCUMENTS

WO    WO 2011/118993 A2    9/2011

OTHER PUBLICATIONS

3GPP; 3rd Generation Partnership Project; Technical Specification Group Radio Access Network; Evolved Universal Terrestrial Radio Access (E-UTRA); Physical channels and modulation; 3GPP TS 36.211 v10.0.0; Dec. 2010; 103 pages; Release 10.

(Continued)

*Primary Examiner* — Warner Wong
(74) *Attorney, Agent, or Firm* — Thorpe North & Western LLP

(57) ABSTRACT

Technology for determining a common search space (CSS) from a physical resource block (PRB) indication for a stand-alone carrier type is disclosed. In an example, a user equipment (UE) configured for determining a common search space (CSS) from a physical resource block (PRB) indication for a stand-alone carrier type can include a processing module to: Determine a PRB set in the CSS from an enhanced physical hybrid automatic repeat request (ARQ) indicator channel (ePHICH) configuration information in a master information block (MIB); and decode an enhanced physical downlink control channel (ePDCCH) or the ePHICH from PRB region candidates in the PRB set.

24 Claims, 15 Drawing Sheets

(51) Int. Cl.

| | | |
|---|---|---|
| H04W 24/10 | (2009.01) | |
| H04W 72/04 | (2009.01) | |
| H04W 72/08 | (2009.01) | |
| H04W 36/00 | (2009.01) | |
| H04J 3/00 | (2006.01) | |
| H04B 1/56 | (2006.01) | |
| H04W 56/00 | (2009.01) | |
| H04W 52/02 | (2009.01) | |
| H04W 76/02 | (2009.01) | |
| H04W 4/22 | (2009.01) | |
| H04W 36/22 | (2009.01) | |
| H04B 15/00 | (2006.01) | |
| H04W 76/04 | (2009.01) | |
| H04B 7/02 | (2006.01) | |
| H04B 7/04 | (2006.01) | |
| H04B 7/06 | (2006.01) | |
| H04W 24/02 | (2009.01) | |
| H04W 72/12 | (2009.01) | |
| H04L 29/02 | (2006.01) | |
| H04W 4/00 | (2009.01) | |
| H04W 4/06 | (2009.01) | |
| H04W 48/20 | (2009.01) | |
| H04L 29/06 | (2006.01) | |
| H04W 4/02 | (2009.01) | |
| H04J 3/26 | (2006.01) | |
| H04L 27/26 | (2006.01) | |
| H04W 72/10 | (2009.01) | |
| H04W 88/06 | (2009.01) | |
| H04W 72/02 | (2009.01) | |
| H04W 16/14 | (2009.01) | |

(52) U.S. Cl.
 CPC ............... *H04B 7/26* (2013.01); *H04B 15/00* (2013.01); *H04J 3/00* (2013.01); *H04J 3/26* (2013.01); *H04L 27/2627* (2013.01); *H04L 29/02* (2013.01); *H04L 69/22* (2013.01); *H04W 4/005* (2013.01); *H04W 4/023* (2013.01); *H04W 4/06* (2013.01); *H04W 4/22* (2013.01); *H04W 24/02* (2013.01); *H04W 24/10* (2013.01); *H04W 36/00* (2013.01); *H04W 36/22* (2013.01); *H04W 48/20* (2013.01); *H04W 52/0212* (2013.01); *H04W 52/0225* (2013.01); *H04W 52/0235* (2013.01); *H04W 56/00* (2013.01); *H04W 72/042* (2013.01); *H04W 72/0413* (2013.01); *H04W 72/0426* (2013.01); *H04W 72/082* (2013.01); *H04W 72/085* (2013.01); *H04W 72/10* (2013.01); *H04W 72/1215* (2013.01); *H04W 76/023* (2013.01); *H04W 76/027* (2013.01); *H04W 76/048* (2013.01); *H04W 16/14* (2013.01); *H04W 72/02* (2013.01); *H04W 88/06* (2013.01); *Y02B 60/50* (2013.01)

(56) References Cited

U.S. PATENT DOCUMENTS

| | | | | |
|---|---|---|---|---|
| 2010/0159938 | A1* | 6/2010 | Shin et al. | 455/450 |
| 2010/0246505 | A1* | 9/2010 | Chong et al. | 370/329 |
| 2010/0254342 | A1* | 10/2010 | Cho et al. | 370/330 |
| 2011/0243090 | A1* | 10/2011 | Grovlen et al. | 370/329 |
| 2012/0063351 | A1* | 3/2012 | Kim et al. | 370/252 |
| 2012/0327895 | A1* | 12/2012 | Wall n et al. | 370/330 |
| 2013/0194956 | A1* | 8/2013 | Sartori et al. | 370/252 |
| 2013/0195019 | A1* | 8/2013 | Lindh et al. | 370/329 |
| 2013/0201975 | A1* | 8/2013 | Chen et al. | 370/336 |
| 2013/0215993 | A1* | 8/2013 | Taghavi Nasrabadi et al. | 375/295 |
| 2013/0242882 | A1* | 9/2013 | Blankenship et al. | 370/329 |
| 2014/0003392 | A1* | 1/2014 | Yang et al. | 370/331 |
| 2014/0064205 | A1* | 3/2014 | Feng et al. | 370/329 |
| 2014/0112280 | A1* | 4/2014 | Lee et al. | 370/329 |
| 2014/0133346 | A1* | 5/2014 | Kang et al. | 370/252 |
| 2014/0185578 | A1* | 7/2014 | Park et al. | 370/329 |
| 2014/0192759 | A1* | 7/2014 | Son et al. | 370/329 |
| 2014/0286281 | A1* | 9/2014 | Jang et al. | 370/329 |
| 2015/0078285 | A1* | 3/2015 | Kim et al. | 370/329 |
| 2015/0085785 | A1* | 3/2015 | Kim et al. | 370/329 |

OTHER PUBLICATIONS

3GPP; 3$^{rd}$ Generation Partnership Project; Technical Specification Group Radio Access Network; Evolved Universal Terrestrial Radio Access (E-UTRA); Physical layers procedures; 3GPP TS 36.213 v10.0.0; Dec. 2010; 98 pages; Release 10.

Ericsson et al.; Views on ePHICH; 3GPP TSG-RAN1 #68bis; P1-121025; Mar. 26-30 2012; 1 page; Agenda Item 7.6.5; Jeju, Republic of Korea.

Fujitsu; Motivation, requirements and design for ePHICH; 3GPP TSG-RAN1 #68bis; R1-121201; Mar. 26-30, 2012; 4 pages; Agenda Item 7.6.5; Jeju, Republic of Korea.

Fujitsu; Summary of email discussion on CSS for ePDCCH; 3GPP TSG-RAN1 #68bis; R10121193; Mar. 26-30 , 2012; 17 pages; Agenda Item 7.6.2; Jeju, Republic of Korea.

Samsung; ePHICH design for Rel-11; 3GPP TSG-Ran1 #68bis; R1-121649; Mar. 26-30, 2012; 3 pages; Agenda Item 7.6.5; Jeju, Republic of Korea.

PCT Application PCT/US2013/040672; filed May 10, 2013; Intel Corporation et al.; International Search Report mailed Aug. 13, 2013.

\* cited by examiner

-- ASN1START

MasterInformationBlock ::=      SEQUENCE {
    dl-Bandwidth                ENUMERATED {n6, n15, n25, n50, n75, n100},
    CSS-Bandwidth               ENUMERATED {BW1,BW2,... BW(size(K)) }
    systemFrameNumber           BIT STRING (SIZE (8)),
    spare                       BIT STRING (SIZE (10))
}

-- ASN1STOP

FIG. 10

-- ASN1START

MasterInformationBlock ::=      SEQUENCE {
    dl-Bandwidth                ENUMERATED {n6, n15, n25, n50, n75, n100},
    CSSRegion-Bandwidth         ENUMERATED {BW1,BW2,... BW(size(K)) }
    CSSRegion-Index             BIT STRING (SIZE (L)),
    systemFrameNumber           BIT STRING (SIZE (8)),
    spare                       BIT STRING (SIZE (10))
}

-- ASN1STOP

FIG. 12

DOWNLINK CONTROL INDICATION FOR A STAND-ALONE NEW CARRIER TYPE (NCT)

RELATED APPLICATIONS

This application claims the benefit of and hereby incorporates by reference U.S. Provisional Patent Application Ser. No. 61/646,223, filed May 11, 2012.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNode B to the UE via a physical downlink shared channel (PDSCH). A physical downlink control channel (PDCCH) can be used to transfer downlink control information (DCI) that informs the UE about resource allocations or scheduling related to downlink resource assignments on the PDSCH, uplink resource grants, and uplink power control commands. The PDCCH can be transmitted prior the PDSCH in each subframe transmitted from the eNode B to the UE.

The PDCCH signal can be designed to be demodulated at the UE based on a cell specific reference signal (CRS). However, the use of a CRS does not take into account the increased complexities of advanced LTE systems. For instance, in heterogeneous networks, multiple nodes can simultaneously transmit within a single cell. The use of the cell specific reference signal can limit advanced techniques to increase cell capacity.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 10 illustrates an example abstract syntax notation one (ASN.1) code for a master information block (MIB) including an information element (IE) CSS-Bandwidth in accordance with an example;

FIG. 12 illustrates an example abstract syntax notation one (ASN.1) code for a master information block (MIB) including an information element (IE) CSSRegion-Bandwidth and an IE CSSRegion-Index in accordance with an example;

Figure 1:
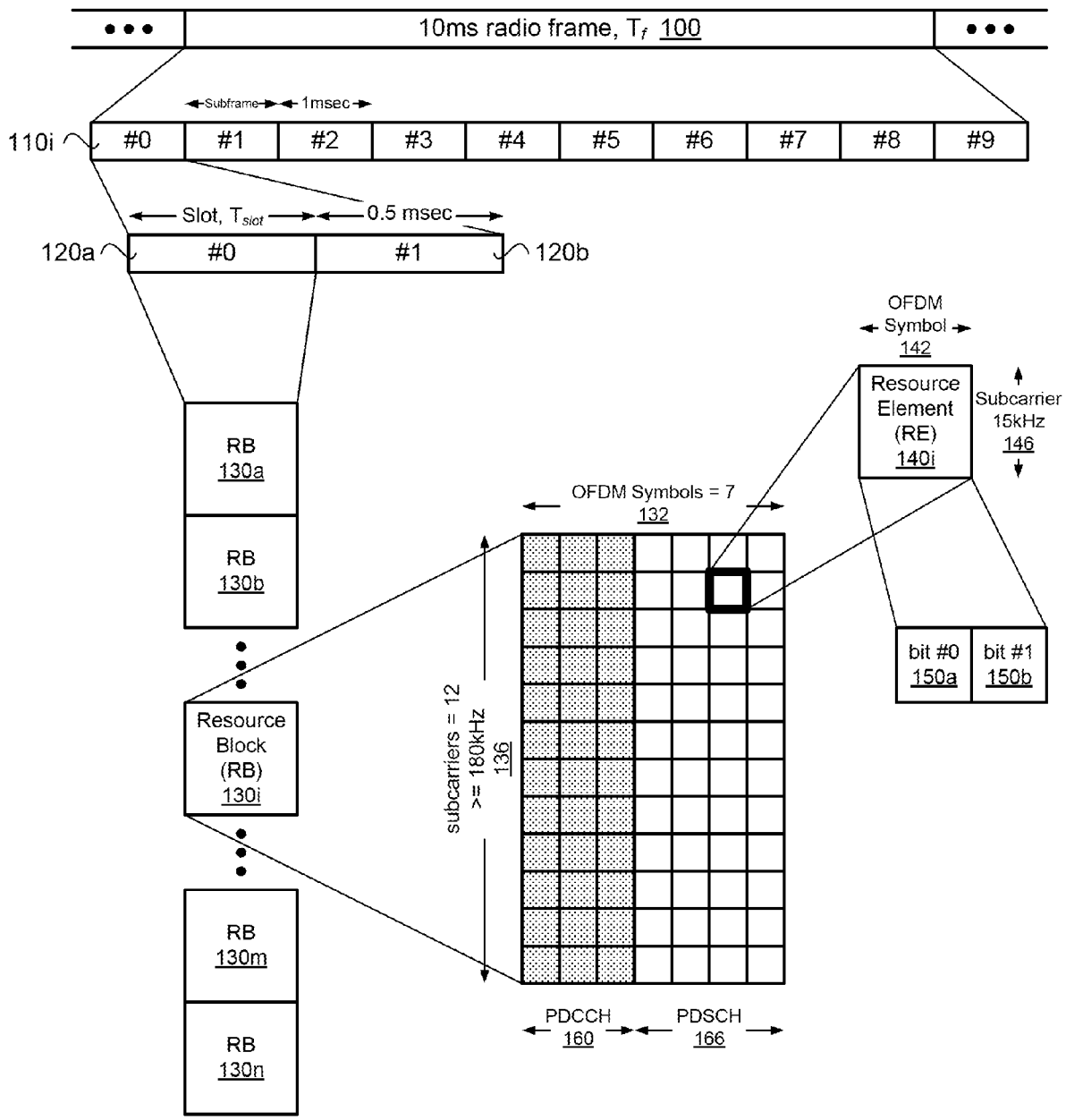
FIG. 1 illustrates a diagram of radio frame resources (e.g., a resource grid) including a legacy physical downlink control channel (PDCCH) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The communication of data on the physical downlink shared channel (PDSCH) can be controlled via a control channel, referred to as a physical downlink control channel (PDCCH). The PDCCH can be used for downlink (DL) and uplink (UL) resource assignments, transmit power commands, and paging indicators. The PDSCH scheduling grant can be designated to a particular wireless device (e.g., UE) for dedicated PDSCH resource allocation to carry UE-specific traffic, or the PDSCH scheduling grant can be designated to all wireless devices in the cell for common PDSCH resource allocation to carry broadcast control information such as system information or paging.

In one example, the PDCCH and PDSCH can represent elements of a radio frame structure transmitted on the physical (PHY) layer in a downlink transmission between a node (e.g., eNodeB) and the wireless device (e.g., UE) using a generic 3GPP long term evolution (LTE) frame structure, as illustrated in FIG. 1.

FIG. 1 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. The first slot (#0) 120$a$ can include a legacy physical downlink control channel (PDCCH) 160 and/or a physical downlink shared channel (PDSCH) 166, and the second slot (#1) 120$b$ can include data transmitted using the PDSCH.

Each slot for a component carrier (CC) used by the node and the wireless device can include multiple resource blocks (RBs) 130$a$, 130$b$, 130$i$, 130$m$, and 130$n$ based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or RB, when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

Each RB (physical RB or PRB) 130$i$ can include 12-15 kHz subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Figure 2:
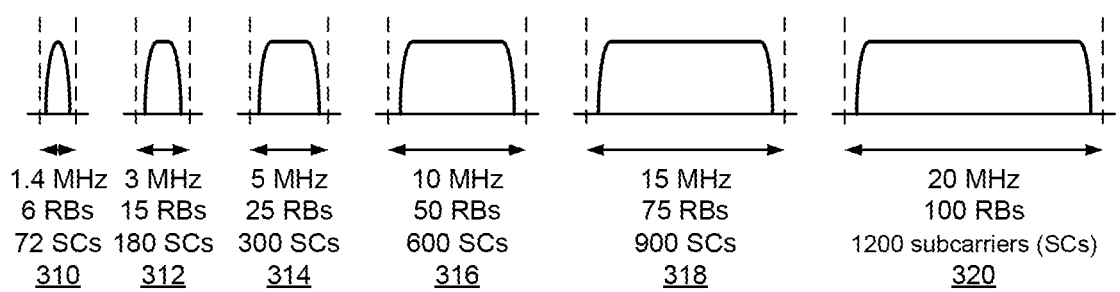
FIG. 2 illustrates a diagram of various component carrier (CC) bandwidths in accordance with an example.

Each wireless device may use at least one bandwidth. The bandwidth may be referred to as a signal bandwidth, carrier bandwidth, or component carrier (CC) bandwidth, as illustrated in FIG. 2. For example, the LTE CC bandwidths can include: 1.4 MHz 310, 3 MHz 312, 5 MHz 314, 10 MHz 316, 15 MHz 318, and 20 MHz 320. The 1.4 MHz CC can include 6 RBs comprising 72 subcarriers. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers.

The data carried on the PDCCH can be referred to as downlink control information (DCI). Multiple wireless devices can be scheduled in one subframe of a radio frame. Therefore, multiple DCI messages can be sent using multiple PDCCHs. The DCI information in a PDCCH can be transmitted using one or more control channel elements (CCE). A CCE can be comprised of a group of resource element groups (REGs). A legacy CCE can include up to nine REGs. Each legacy REG can be comprised of four resource elements (REs). Each resource element can include two bits of information when quadrature modulation is used. Therefore, a legacy CCE can include up to 72 bits of information. When more than 72 bits of information are needed to convey the DCI message, multiple CCEs can be employed. The use of multiple CCEs can be referred to as an aggregation level. In one example, the aggregation levels can be defined as 1, 2, 4 or 8 consecutive CCEs allocated to one PDCCH.

The legacy PDCCH can create limitations to advances made in other areas of wireless communication. For example, mapping of CCEs to subframes in OFDM symbols can typically be spread over the control region to provide frequency diversity. However, no beam forming diversity may be possible with the current mapping procedures.

Moreover, the capacity of the legacy PDCCH may not be sufficient for advanced control signaling. For instance, networks may be configured as heterogeneous networks (HetNets) that can include a number of different kinds of nodes in a single macro cell serving area. More wireless devices can be served simultaneously by macro and pico cells in the HetNet.

The PDCCH can be designed to demodulate based on cell-specific reference signals (CRS), which can make fully exploring cell splitting gain difficult. The legacy PDCCH may not be adequate to convey the information needed to allow a wireless device to take advantage of the multiple transmission nodes in the HetNet to increase bandwidth and decrease battery usage at the wireless device.

In addition, an increased capacity in the PDCCH can be useful in the use of multi-user multiple-input multiple-output (MU-MIMO), machine to machine communication (M2M), PDSCH transmission in a multicast\broadcast single-frequency network, and cross carrier scheduling. The use of UE specific reference signals (UERS) in PDCCH demodulation at the wireless device can allow the use of multiple nodes in the HetNet. Rather than relying on a single common reference symbol (e.g., CRS) for an entire cell, each reference symbol can be UE specific (e.g., UERS).

To overcome the limitations of the legacy PDCCH, an enhanced PDCCH (ePDCCH) can use the REs in an entire PRB or PRB pair (where a PRB pair is two contiguous PRBs using the same subcarrier's subframe), instead of just the first one to three columns of OFDM symbols in a first slot PRB in a subframe as in the legacy PDCCH. Accordingly, the ePDCCH can be configured with increased capacity to allow advances in the design of cellular networks and to minimize currently known challenges and limitations.

Unlike the legacy PDCCH, the ePDCCH can be mapped to the same REs or region in a PRB as the PDSCH, but in different PRBs. In an example, the PDSCH and the ePDCCH may not be multiplexed within a same PRB (or a same PRB pair). Thus if one PRB (or one PRB pair) contains an ePDCCH, the unused REs in the PRB (or PRB pair) may be blanked, since the REs may not be used for the PDSCH.

As the evolution of LTE-advanced (LTE-A) keeps increasing support for multi-user MIMO (MU-MIMO), more UEs can be scheduled per sub-frame for the MU-MIMO operation, which can increase the physical down link control channel (PDCCH) resource demand for downlink scheduling. The legacy PDCCH design (e.g., LTE Rel-8/9/10) with the maximum PDCCH size of 3 OFDM symbols may not meet an increased demand, which can consequently limit the gain from MU-MIMO. The PDCCH extension design, called enhanced PDCCH (ePDCCH, EPDCCH, or E-PDCCH), can be located in the PDSCH region for an advanced PDCCH (e.g., LTE Release 11 and subsequent releases). The ePDCCH can use a PRB-based (instead of CCE-based PDCCH design) multiplexing scheme to increase the PDCCH capacity and improve enhanced inter-cell interference coordination (eICIC) support in HetNet scenarios. The limitation of the legacy PDCCH design to effectively perform inter-cell interference coordination (ICIC) on the legacy PDCCH can be due to PDCCH interleaving, where the control channel elements (CCEs) used for the transmission of DCI formats in PDCCH are distributed over the entire bandwidth (BW). Conversely, the enhanced PDCCH (ePDCCH) in PDSCH region can be designed using a PRB-based scheme to achieve the benefit to support frequency-domain ICIC.

A network can support frequency domain inter-cell interference coordination (ICIC) or time domain enhanced ICIC (eICIC). In an example, ICIC can be used to decrease interference between neighboring cells or nodes (e.g., coordination nodes or cooperation nodes) by lowering the power of a part of the subchannels in the frequency domain which then can be received close to the node. The subchannels do not interfere with the same subchannels used in neighboring cells and thus, data can be sent to mobile devices with less interference on the subchannels close to the cell.

Enhanced ICIC (eICIC) can be used in the time domain for heterogeneous networks (HetNets), where a high power macro cell can be complemented with low power nodes such as pico cells (hotspots in shopping centers or at airports) or femto cells (hotspots in small areas such as homes or businesses). The low power nodes can exist inside a macro cell coverage area. The macro cell can transmit long range high power signals, and the low power nodes can transmit low power signals over short distances. In an example to mitigate interference between the macro cell and the several low power nodes located within the macro cell coverage area, eICIC can coordinate the blanking of subframes in the time domain in the macro cell.

In some carrier types supporting ePDCCH (e.g., carrier types in LTE-Release 11), the location and size of the ePDCCH regions can be indicated to the user equipment/mobile station (UE/MS) through radio resource control (RRC) signaling, which can use the PDCCH and UE's reading of PDCCH to obtain such RRC configuration from a primary cell (PCell). However, new carrier types (NCT), which may be used by next generation UEs/MSs (e.g., UEs/MSs using LTE-Release 12 and subsequent releases), may use stand-alone carriers without a legacy PDDCH. The methods, devices, and systems described herein can be used to inform the UE of location of the ePDCCH without relying on the legacy PDDCH or RRC signaling from the PCell.

First Technical Problem

Overhead resource elements (RE), such as cell-specific reference signals (CRS), legacy control channel, channel state information reference signal (CSI-RS), and enhanced physical hybrid automatic repeat request (ARQ) indicator channel (ePHICH) (if available), can be encoded and/or decoded using at least two alternatives: Fully puncturing all the overhead REs, or fully rate matching around the overhead REs.

In coding theory, puncturing is the process of removing some of the parity bits after encoding with an error-correction code. Puncturing can have the same effect as encoding with an error-correction code with a higher rate (e.g., modulation and coding scheme (MCS)), or less redundancy. With puncturing a same decoder can be used regardless of how many bits have been punctured, thus puncturing can considerably increase the flexibility of a system without significantly increasing the system's complexity.

In some cases, a pre-defined pattern of puncturing can be used in an encoder. Then, the inverse operation, known as depuncturing, can be implemented by the decoder. Puncturing can be used in LTE during a rate matching process. In an example, puncturing can be used with the Viterbi algorithm in coding-systems.

The rate matching (RM) process can adapt the code rate of the LTE data transmissions such that the number of information and parity bits to be transmitted matches the resource allocation. For example, based on a 1/3 mother code rate of the turbo coder, the LTE rate matching can use a circular buffer to either repeat bits to decrease the code rate or puncture bits to increase the code rate.

In the ePDCCH design, the overhead REs in the PRB pair that the ePDCCH is transmitted can use puncturing or rate matching. Both puncturing and rate matching have benefits and disadvantages (e.g., pros and cons—shortening of the Latin "pro et contra", which means "for and against"), as illustrated in Table 1. Table 1 illustrates a comparison for puncturing and rate matching in the presence of overhead REs based on link level performance, DCI decoding ambiguity, and UE complexity of implementation.

TABLE 1

|  | Puncturing based | Rate matching based |
| --- | --- | --- |
| Link level performance | Difficult or impossible for high puncturing ratio; Poor performance for low puncturing ratio | Better link level performance |
| DCI decoding ambiguity | No DCI decoding ambiguity during overhead reconfiguration | UE needs to determine the configuration of other signals correctly; UE may not decode ePDCCH if the UE doesn't know the overhead of other signals |
| UE complexity | Low complexity because of no rate matching | High complexity because UE adjusts the rate matching block according to different overhead |

First Solution

Puncturing or rate matching can be applied based on the type of overhead REs, which can be used in the presence of ePDCCH. Based on the comparisons in Table 1, each alternative (e.g., puncturing or rate matching) can have its own advantages and disadvantages. Instead of applying only puncturing and only rate matching to all types of overhead, the node or UE can adaptively apply puncturing and rate matching to different types of overhead for optimizing the performance for both a backward compatible carrier (e.g., carriers in LTE-Rel. 8/9/10/11) and stand-along carriers (e.g., carriers in LTE-Rel. 12 and subsequent versions).

In the backward compatible carrier UE can determine a cell specific reference signal (CRS) configuration, a primary synchronization signals (PSS), a secondary synchronization signals (SSS), a physical broadcast channel (PBCH), or a positioning reference signal (PRS) before the UE decodes the ePDCCH. Since the CRS, PSS, SSS, PBCH, and PRS signals can consume a large number of REs, rate matching can be suitable for these REs because high puncturing ratio can make ePDCCH performance unacceptable. In addition, since the receiving power of the CRS can be much higher than the ePDCCH data signal due to deployment of distributed remote radio head (RRH) systems, the large CRS interference on the punctured REs can worsen the performance degradation.

For control signals with a smaller size and a more dynamic nature, such as channel state information reference signal (CSI-RS), puncturing can be applied. For example, CSI-RS REs can be indicated using RRC signaling and CSI-RS overhead can be relatively small. For overhead REs with a smaller size, applying puncturing can be better to avoid reconfiguration caused decoding ambiguity. For another example, ePHICH, if introduced, can have a dynamic load driven by uplink traffic, where puncturing can be more advantageous.

In a stand-alone carrier type (e.g., NCT), another overhead reference signal (RS) can be used. A similar approach to using puncturing or rate matching can be used as described above for a backward compatible carrier. In another example, rate matching can be applied a for legacy control region (backward compatible component carrier (CC)), CRS, PSS/SSS, PBCH, PRS, demodulation reference signal (DMRS) (e.g., 24 REs), and puncturing can be applied for CSI-RS and ePHICH (if presented in ePDCCH PRB pair).

First Advantageous Effect(s)

Applying puncturing or rate matching based on the overhead REs can capture the gains from either puncturing or rate matching and remove or mitigate the disadvantages of puncturing or rate matching, respectively. Each type of overhead RE can use an encoding and/or decoding mechanism for the overhead RE to provide a better benefit for the system.

Figure 3:
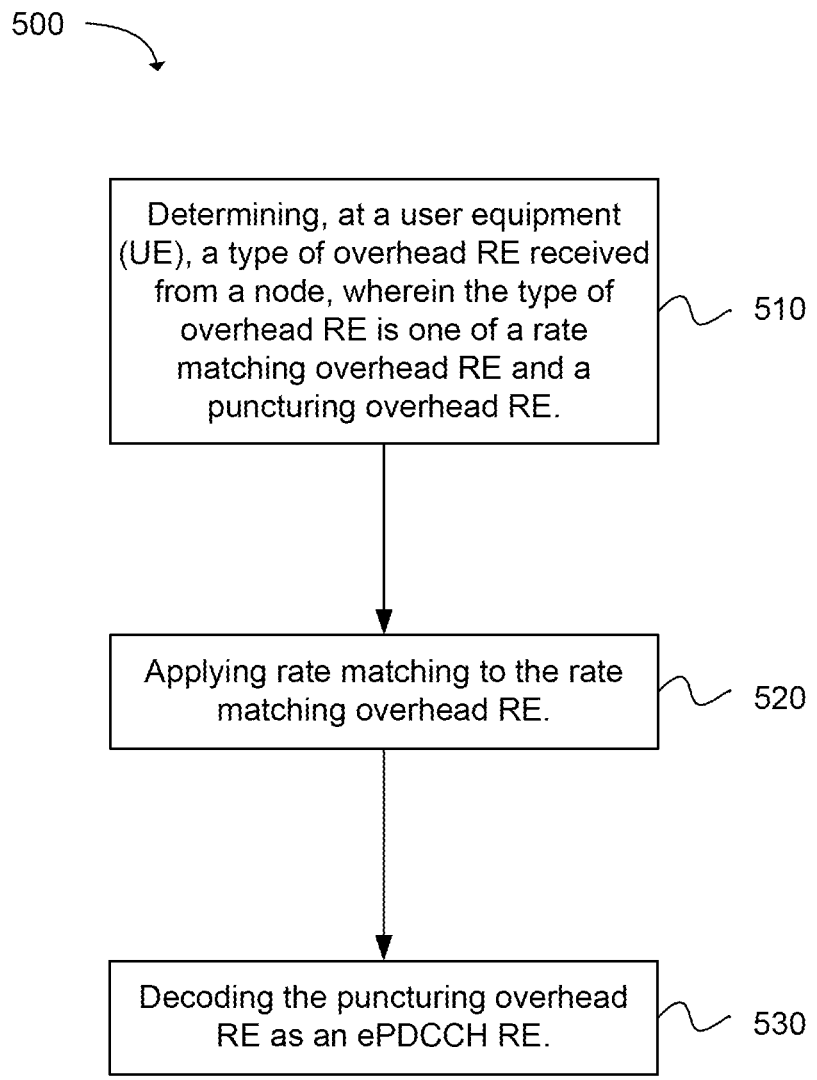
FIG. 3 depicts a flow chart of a method for adaptively decoding overhead resource elements (REs) in a physical resource block (PRB) used for an enhanced physical downlink control channel (ePDCCH) transmission in accordance with an example.

Another example provides a method 500 for adaptively decoding overhead resource elements (REs) in a physical resource block (PRB) used for an enhanced physical downlink control channel (ePDCCH) transmission, as shown in the flow chart in FIG. 3. The method may be executed as instructions on a machine, where the instructions are included on at least one computer readable medium or one non-transitory machine readable storage medium. The method includes the operation of determining, at a user equipment (UE), a type of overhead RE received from a node, wherein the type of overhead RE is one of a rate matching overhead RE and a puncturing overhead RE, as in block 510. The operation of applying rate matching to the rate matching overhead RE follows, as in block 520. The next operation of the method can be decoding the puncturing overhead RE as an ePDCCH RE, as in block 530.

The rate matching overhead RE can include a legacy control region, a backward compatible component carrier, a cell-specific reference signal (CRS), a primary synchronization signals (PSS), a secondary synchronization signals (SSS), a physical broadcast channel (PBCH), a positioning reference signal (PRS), or a demodulation reference signal (DMRS). The puncturing overhead RE can include a channel state information reference signal (CSI-RS), an enhanced physical hybrid automatic repeat request (ARQ) indicator channel (ePHICH). In an example, the rate matching overhead can be indicated using radio resource control (RRC) signaling. Puncturing can be transparent to the UE, so the UE can treat the overhead RE as an ePDCCH RE. Thus, depuncturing maybe not by applied by the UE. In another example, the overhead RE and ePDCCH can use a backward compatible carrier or a stand-alone carrier. The stand-alone carrier can be a carrier without a legacy physical downlink control channel (PDCCH).

Second Technical Problem

Another technical problem can be informing the UE of location of the ePDCCH without relying on the legacy PDDCH or RRC signaling for the stand-alone carrier type (e.g., NCT). The stand-alone carrier type can be used in advanced-LTE (e.g., 3GPP Rel. 12). Some of the current output of ePDCCH can smoothly migrate to the stand-alone NCT except a common search space (CSS). Since UE may detect information in an initial access stage from the CSS in order to establish RRC connection, UE may need to be informed of the CSS in stand-alone carrier type.

For example, a mechanism can be used to indicate to the UE where to search for the ePDCCH configuration information. In an example, the mechanism can be used to indicate the location and size of the common search space (CSS) of the ePDCCH region for stand-alone carriers. Once the CSS is determined and found by the UE, the UE can subsequently determine the UE-specific search space (USS) configuration by reading the RRC signaling indicated through CSS from the eNB.

Second Solution

A physical hybrid automatic repeat request (ARQ) indicator channel (PHICH) can be used to indicate the PRBs of CSS for the stand-alone carrier type (e.g., NCT). The 3 bits for PHICH configuration information in a master information block (MIB) can be reused. The MIB information can be used to indicate the ePDCCH region, and the MIB information can also be used to indicate the CSS or other control region.

3 bits of the PHICH configuration information can be included in MIB. 1 bit can be used to indicate whether PHICH extension is used and the other 2 bits can be used for PHICH resources configuration (e.g., 0.25, 0.5, 1, or 2 times the $N_{PHICH}$) where $N_{PHICH}$ can be a parameter related to system bandwidth. The PHICH configuration information can be decoded in an earlier stage before DCI decoding, so the PHICH configuration information can be used by the UE to determine the CSS position in stand-alone carrier type because the PHICH extension configuration may not be needed in stand-alone carrier type.

Since the PHICH may not be used for stand-alone carrier type, the 3 bits (which can represent eight different hypotheses) can be used to configure the PRB where CSS or other control channels (such as PHICH) are transmitted in the stand-alone carrier type.

Figure 4A:
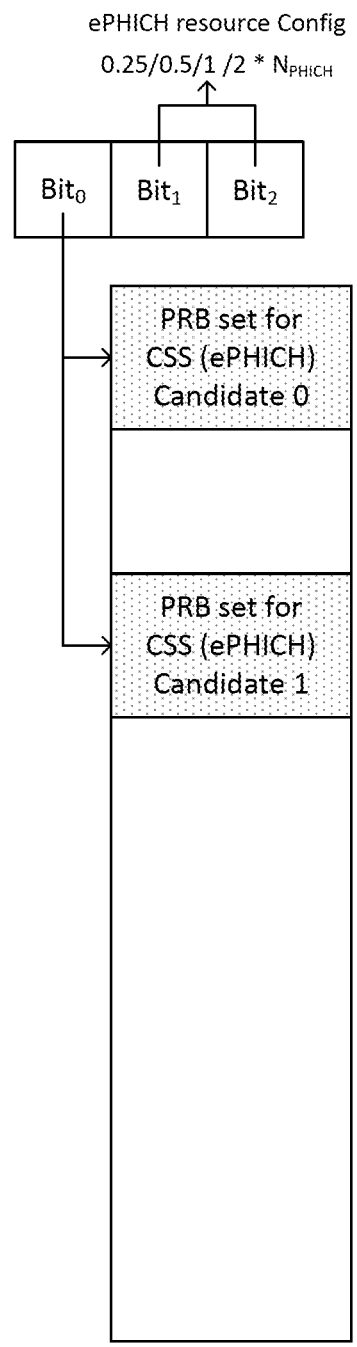
FIG. 4A illustrates a diagram of an enhanced physical hybrid automatic repeat request (ARQ) indicator channel (ePHICH) configuration indicator to indicate two physical resource block (PRB) region candidates and up to four ePHICH resource configurations in accordance with an example.

At least two different options can be used when the ePHICH shares the same resources with ePDCCH and the ePHICH resource punctures the ePDCCH resource. In a first option, two PRB region candidates (e.g., candidates 0 and 1 represented by $Bit_0$) can be predefined for the CSS and jointly encoded with four ePHICH resource configurations (e.g., 0.25, 0.5, 1, or 2 times the $N_{PHICH}$), as shown in FIG. 4A. The 2 PRB region candidates can be used by neighboring cells to select different PRBs for CSS in order to achieve frequency ICIC. In another alternative, the two PRB region candidates can be cell common and determined solely by system bandwidth, then enhanced CCE (eCCE) level ICIC can be used and the PRB region candidate bit (e.g., $Bit_0$) can be used to indicate an eCCE candidate.

Figure 4B:
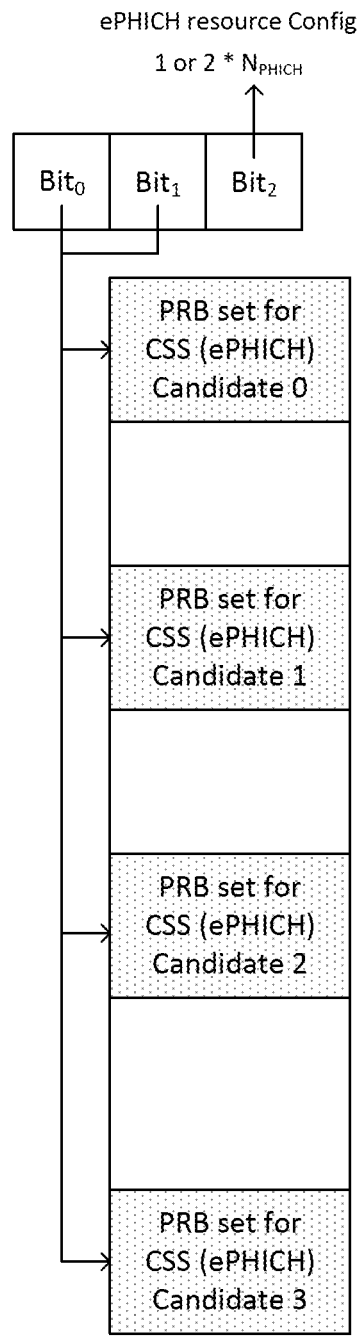
FIG. 4B illustrates a diagram of an enhanced physical hybrid automatic repeat request (ARQ) indicator channel (ePHICH) configuration indicator to indicate four physical resource block (PRB) region candidates and up to two ePHICH resource configurations in accordance with an example.

In a second option, since ePHICH resource can puncture the ePDCCH resource, the ePHICH resource configuration can be decreased from 2 bits to 1 bit (e.g., $Bit_2$ for 1 or 2 times $N_{PHICH}$ instead of $Bit_1$ and $Bit_2$ for 0.25, 0.5, 1, 2 times $N_{PHICH}$) because the idle resource allocated to ePHICH can be reused by ePDCCH, as shown in FIG. 4B. As a result, resource wastage can be reduced so resources actually needed for ePHICH are allocated to ePHICH. With one bit (e.g., $Bit_2$) used for the ePHICH resource configuration, two bits ($Bit_0$ and $Bit_1$) can be used to select more PRB region candidates (e.g., candidates 0-3) for CSS to achieve better ICIC results.

Figure 4C:
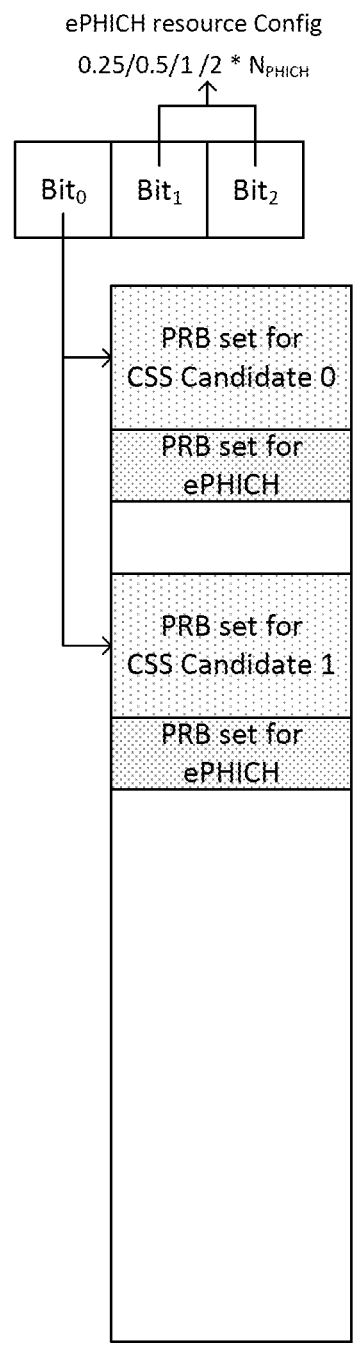
FIG. 4C illustrates a diagram of an enhanced physical hybrid automatic repeat request (ARQ) indicator channel (ePHICH) configuration indicator to indicate two physical resource block (PRB) region candidates with a separate PRB set for common search space (CSS) and ePHICH and up to four ePHICH resource configurations in accordance with an example.

When dedicated resources are assigned for an ePHICH transmission, a third option can be used. In the third option, the PRB used for CSS can be similarly indicated as the first option, and PRB used for ePHICH transmission can be implicitly indicated by the 3 bits, as shown in FIG. 4C. For example, the ePHICH PRB can start from a PRB next to a last PRB that belongs to the CSS of the ePDCCH. Then the 1 bit (e.g., $Bit_0$) used to indicate PRB candidate of CSS can also indicate the PRB of ePHICH. The PRB set for ePHICH can be a predefined or configured offset from the PRB set for each CSS candidate. The other two bits ($Bit_1$ and $Bit_2$) can be used for ePHICH resource indication.

Figure 5:
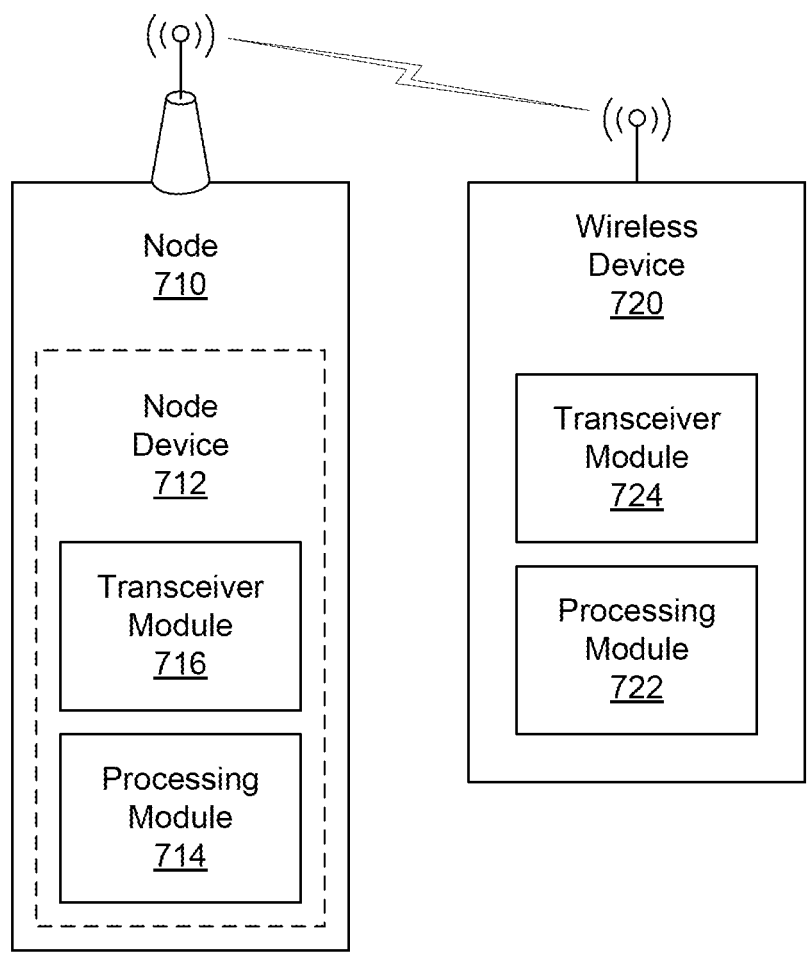
FIG. 5 illustrates a diagram of a node (e.g., eNB) and wireless device (e.g., UE) in accordance with an example.

FIG. 5 illustrates an example node 710 (e.g., eNB) and an example wireless device 720 (e.g., UE). The node can include a base station (BS), a Node B (NB), an evolved Node B (eNB), a baseband unit (BBU), a remote radio head (RRH), a remote radio equipment (RRE), a remote radio unit (RRU), or a central processing module (CPM). The node can include a node device 712. The node device or the node can be configured to communicate with the wireless device. The node device can be configured to generate an enhanced physical hybrid automatic repeat request (ARQ) indicator channel (ePHICH) configuration information in a master information block (MIB) for a physical resource block (PRB) indication for a common search space (CSS) used in a stand-alone carrier type. The node device can include a processing module 714 and a transceiver module 716. The processing module can be configured to generate the ePHICH configuration information. The processing module can be configured to encode the DCI in PRB set of the ePDCCH indicated by the ePHICH configuration information. The transceiver module can be further configured to transmit the MIB including the ePHICH configuration information and/or the ePDCCH to the UE.

Figure 6:
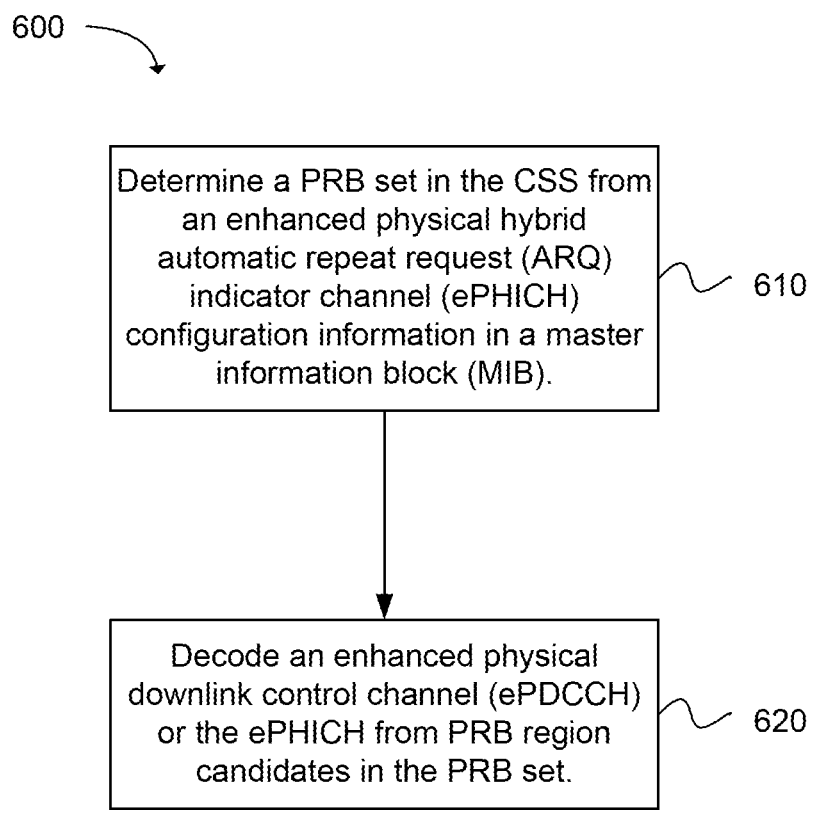
FIG. 6 depicts a flow chart of a processing module of a user equipment (UE) configured for determining a common search space (CSS) from a physical resource block (PRB) indication for a stand-alone carrier type in accordance with an example.

The wireless device 720 can include a transceiver module 724 and a processing module 722. The wireless device can be configured for determining a common search space (CSS) from a physical resource block (PRB) indication for a stand-alone carrier type, as shown in the flow chart 600 in FIG. 6. The processing module or decoder can be configured to determine a PRB set in the CSS from an enhanced physical hybrid automatic repeat request (ARQ) indicator channel (ePHICH) configuration information in a master information block (MIB), as in block 610. The processing module can be configured to decode an enhanced physical downlink control channel (ePDCCH) or the ePHICH from PRB region candidates in the PRB set, as in block 620. The transceiver module can be configured to receive the MIB including the ePHICH configuration information from a node. The stand-alone carrier type can be a new carrier type (NCT) without a legacy physical downlink control channel (PDCCH).

In an example, the ePHICH configuration information can include 3 bits. One bit can be used to indicate two PRB region candidates, and 2 bits can be used to indicate up to four ePHICH resource configurations, as shown in FIG. 3A. An ePHICH resource configuration can be a multiple of an $N_{PHICH}$ and the $N_{PHICH}$ can be a parameter related to a system bandwidth. In another example, an ePHICH transmission can be implicitly indicated by the 3 ePHICH configuration information bits, and an ePHICH PRB can begin from a specified PRB prior to a last PRB for the CSS of the ePDCCH indicated by the ePHICH configuration information bits, as shown in FIG. 3C.

In another example, the ePHICH configuration information can include 3 bits. Two bits can be used to indicate four PRB region candidates, and 1 bit can be used to indicate up to two ePHICH resource configurations. An ePHICH resource configuration can be a multiple of an $N_{PHICH}$ and the $N_{PHICH}$ can be a parameter related to a system bandwidth, as shown in FIG. 3B.

Figure 7:
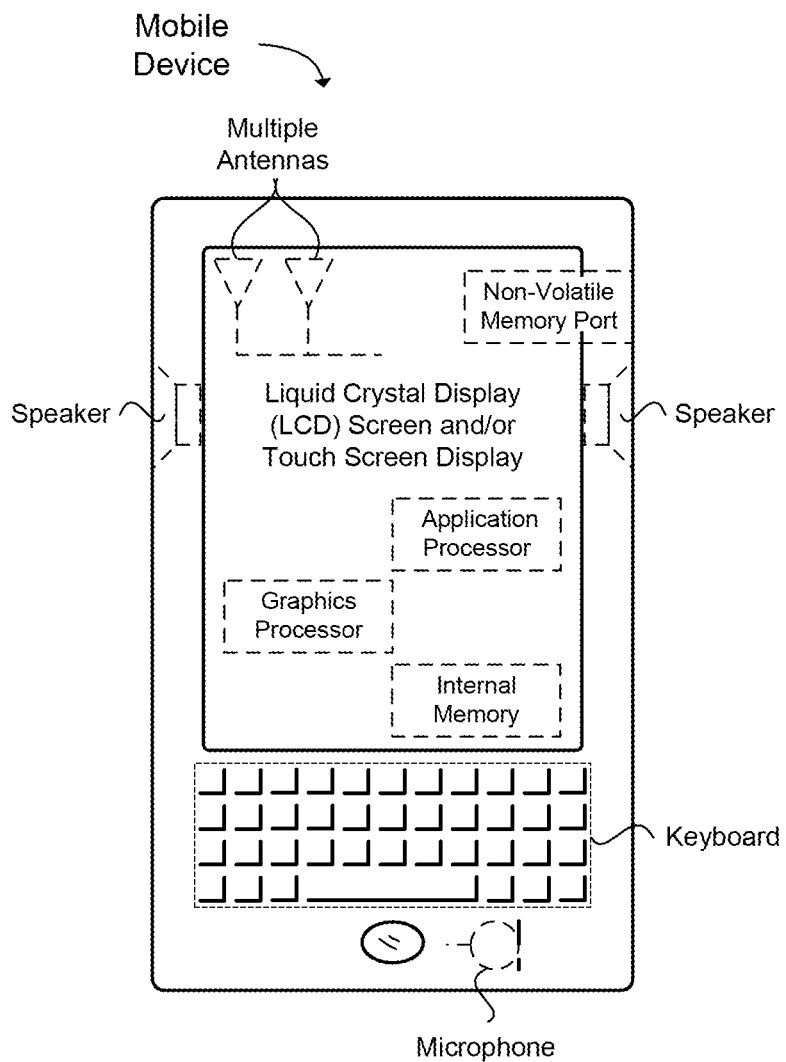
FIG. 7 illustrates a diagram of a wireless device (e.g., UE) in accordance with an example.

FIG. 7 provides an example illustration of the UE, such as a wireless device, a mobile station (MS), a mobile wireless device, a mobile communication device, a tablet, a handset, or other type of wireless device. The UE can include one or more antennas configured to communicate with a node, macro node, low power node (LPN), or transmission station, such as a base station (BS), an evolved Node B (eNB), a baseband unit (BBU), a remote radio head (RRH), a remote radio equipment (RRE), a relay station (RS), a radio equipment (RE), a central processing module (CPM), or other type of wireless wide area network (WWAN) access point. The UE can be configured to communicate using at least one wireless communication standard including 3GPP LTE, WiMAX, High Speed Packet Access (HSPA), Bluetooth, and WiFi. The UE can communicate using separate antennas for each wireless communication standard or shared antennas for multiple wireless communication standards. The UE can communicate in a wireless local area network (WLAN), a wireless personal area network (WPAN), and/or a WWAN.

FIG. 7 also provides an illustration of a microphone and one or more speakers that can be used for audio input and output from the UE. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the UE or wirelessly connected to the UE to provide additional user input. A virtual keyboard may also be provided using the touch screen.

In another configuration, at least two methods (or alternatives) can be used to indicate the common search space (CSS) of the ePDCCH (E-PDCCH or EPDCCH) channel location for the stand-alone carrier type (e.g., NCT). In an example, the CSS design can support the narrow-bandwidth operation for low cost machine type communication (MTC) devices/UEs, which can be taken into account to enable MTC devices/UEs to operate on the stand-alone carrier type.

Figure 8:
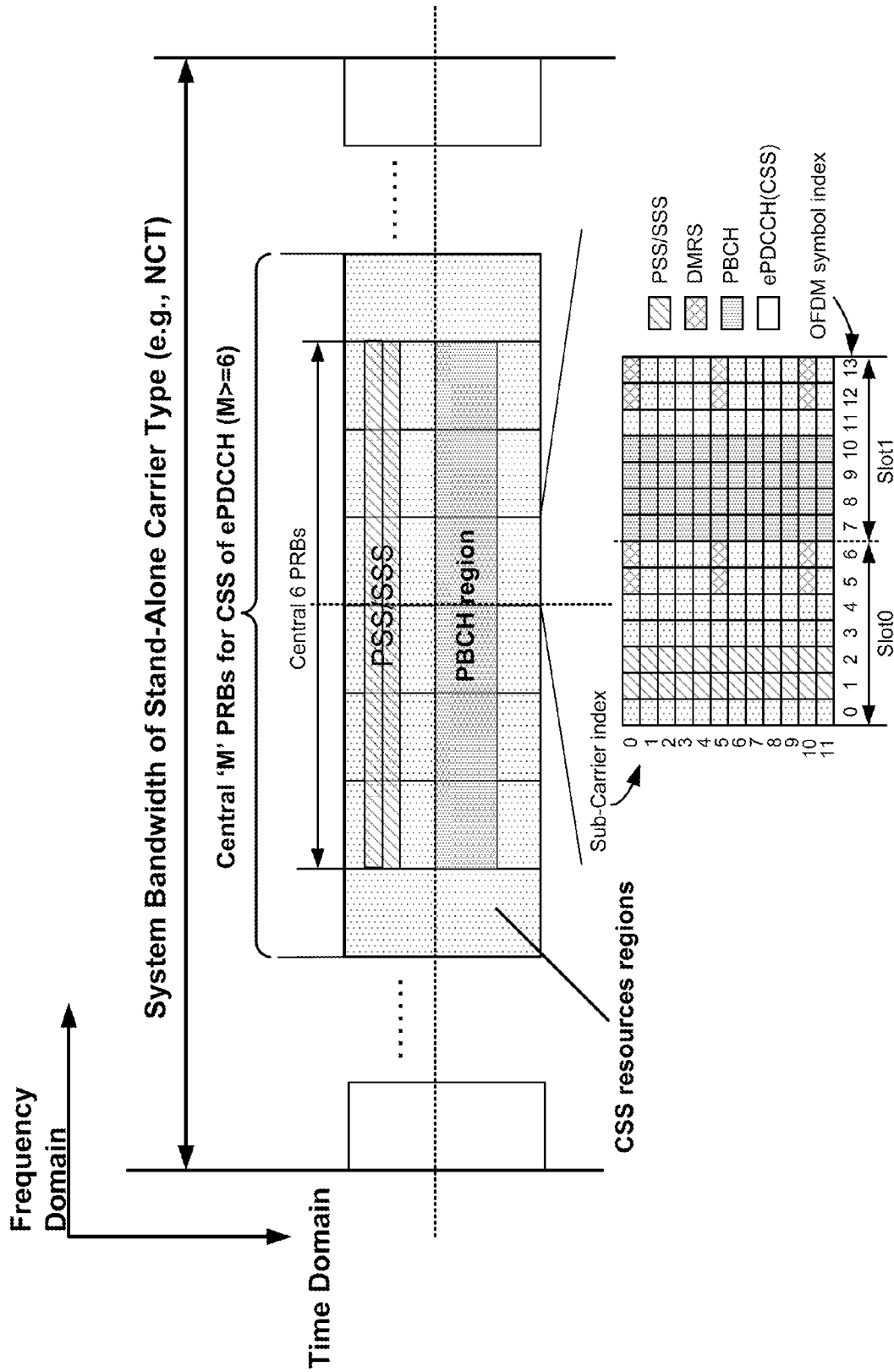
FIG. 8 illustrates a diagram of resource mapping for common search space (CSS) of enhanced physical downlink control channels (ePDCCH) in accordance with an example.

In a first alternative, as illustrated in FIG. 8, the CSS of the ePDCCH can be mapped to a central 'M' number (e.g., M≥6) physical resources blocks (PRBs) around the direct current (DC) subcarrier (or zero frequency subcarrier). The DC subcarrier can refer to the subcarrier whose frequency is equal to the radio frequency center frequency of the node. FIG. 8 illustrates resource mapping for common search space (CSS) of ePDCCH.

The legacy PDCCH region for a legacy UE (e.g., using a carrier type in LTE-Rel 8/9/10/11) can span a full bandwidth (e.g., 5 MHz or 10 MHz). The PDCCH can provide control information to a data allocation in a PDSCH. The transmission of main synchronization signals (e.g., primary synchronization signals [PSS] and secondary synchronization signals [SSS]) can occupy a central part (e.g., 6 PRBs) of an available spectrum of a bandwidth subframe along with a physical broadcast channel (PBCH). In an example, the main synchronization signals can be limited to a narrow bandwidth allocation (e.g., 6 PRBs) around a central direct current (DC) subcarrier. Because the bandwidth of the synchronization signals can be limited to an approximately 1.4 MHz bandwidth (e.g., 6 PRBs in the frequency domain), in an example, the wireless device (e.g., UE) can have at least a 1.4 MHz bandwidth to perform system acquisition and to process the synchronization signals. Thus, in an example, a minimal supported bandwidth device can have a bandwidth of at least 1.4 MHz. Such minimal supported bandwidth device can also decode the legacy PBCH since a PBCH position in frame can be predetermined and located in the narrow bandwidth allocation in the center of the available spectrum similar to synchronization signals. Transmission of important system information may be also carried out in the central part of the spectrum or acquired through a specific narrow bandwidth control message that can be transmitted in central part of the spectrum.

For legacy PDCCHs, blind decoding can be used detect a UE's DCI. The UE may only be informed of the number of OFDM symbol within the control region of a subframe and may not be provided with an exact location of the UE's corresponding PDCCH. The PDCCH or ePDCCH can provide control information to multiple UEs in a cell for each subframe k. The UE can perform blind decoding since the UE may be aware of the detailed control channel structure, including the number of control channels (CCHs) and the number of legacy control channel elements (CCEs) to which each control channel is mapped. Multiple PDCCHs can be transmitted in a single subframe k which may or may not be relevant to a particular UE. Because the UE does not know the precise location of the DCI information in a PDCCH, the UE can search and decode the CCEs in the PDCCH until the DCI is found for the UE's CCs. The PDCCH candidates for DCI detection can be referred to as a search space. The UE can find the PDCCH specific to the UE (or the UE's CCs) by monitoring a set of PDCCH candidates (a set of consecutive CCEs on which the PDCCH could be mapped) in a PDCCH search space in each subframe.

In the 3GPP LTE specification, such as in Release 8, 9, 10, or 11, the UE can use a radio network temporary identifier (RNTI) that can be assigned to the UE by the eNB to try and decode candidates. The RNTI can be used to demask a PDCCH candidate's cyclic redundancy check (CRC) that was originally masked by the eNB using the UE's RNTI. If the PDCCH is for a specific UE, the CRC can be masked with a UE unique identifier, for example a cell-RNTI (C-RNTI) used in a downlink. If no CRC error is detected the UE can determine that a PDCCH candidate carries the DCI for the UE. If a CRC error is detected then the UE can determine that PDCCH candidate does not carry the DCI for the UE and the UE can increment to the next PDCCH candidate. The UE may increment to the next PDCCH candidate in the search space based on the CCE aggregation level.

Figure 9:
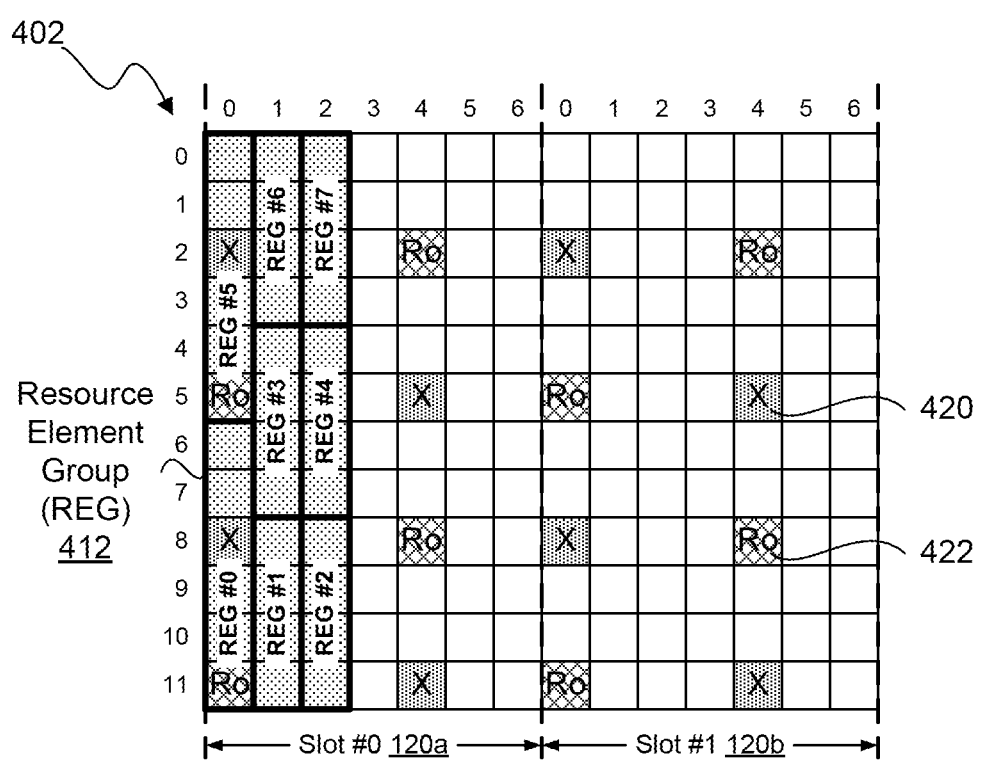
FIG. 9 illustrates a diagram of a resource element group (REG) for legacy physical downlink control channel (PDCCH) in a physical resource block (PRB) in accordance with an example.

The DCI can be mapped to the legacy PDCCH using legacy resource element groups (REGs) except both the PCFICH and PHICH, as illustrated in FIG. 9. REGs can be used for defining the mapping of control channels to resource elements. A RB may include reference signal REs (reference signal OFDM symbols) 422 used for transmitting reference signals for a specific antenna port and unused REs (unused OFDM symbols) 420 not used for transmission on the specific port, which allow other antenna ports to transmit their reference signals. The number of reference signal REs and unused REs used in the RB can depend on the number of antenna ports. REGs can be used to map control channels to the remaining resource elements. REGs include a symbol quadruplet or four REs that do not include reference signal REs.

For example, a two antenna port configured RB 502 with a CFI=3 can include seven REGs 512 in the control region or seven REGs used for the PDCCH (if no REGs are used for PCFICH and PHICH), as illustrated in FIG. 9. The REGs in the control region of the RBs for a CC can comprise the PDCCH. Each CCE used in the PDCCH can include 9 REGs. The PDCCH can be formed with one or more successive CCEs. A plurality of PDCCHs can be transmitted in a single subframe.

The stand-alone carrier type can use an ePDCCH without the legacy PDCCH. The transmission of the CSS of ePDCCH can reuse the ePDCCH resources mapping methods including channel coding, interleaving and enhanced resource element group (eREG) mapping. The ePDCCH may also use blind decoding. The ePDCCH can be mapped to eREGs and/or enhanced CCEs (eCCEs). For example, a start symbol of the CSS can start from a first OFDM symbol in a first slot (e.g., slot 0 of the allocated PRBs as shown in FIG. 8) since the legacy PDCCH region may not be transmitted for the stand-alone carrier type. An end symbol of CSS can end at the last OFDM symbol in one subframe (e.g., the OFDM symbol index 13 shown in FIG. 8). The PRB numbers in the frequency domain for the CSS ('M' value) can be a value of the CSS PRB size, which can be a fixed value specified in the specification or indicated and/or signaled through a pre-processing physical layer channel (e.g., physical broadcast channel (PBCH)). In an example, a maximum number of PRBs used for CSS of ePDCCH can be less than a bandwidth (BW) size supported by the low cost MTC UEs to enable MTC devices/UEs to decode the CSS. Additionally, the CSS can be transmitted on the same set of antenna ports as the PBCH with either transmit diversity or random beamforming if more than one antenna port is used.

At least three methods (or options) can rely on the PBCH channel to provide the CSS BandWidth (BW) indication. In Option 1 (for the CSS of the ePDCCH mapped to the central PRBs), the PRB numbers information can be carried by an IE in the master information block (MIB) via RRC signaling. In Option 1 (for the CSS of the ePDCCH mapped to the central PRBs), multiple bandwidth candidates for each CSS can be predefined in the specification which can be independent of a system BW. Since the UE can determine the exact BW value corresponding to each BW (i) in the MIB, the corresponding CSS bandwidth information can be obtained after MIB decoding. The index i can be integer for each available bandwidth.

FIG. 10 illustrates an example abstract syntax notation one (ASN.1) code for a master information block (MIB) including an information element (IE) CSS-Bandwidth. The CSS-Bandwidth IE can have a MasterInformationBlock field description with parameters: Transmission bandwidth configuration for the 'M' number CSS in a downlink, and total of 'K' size CSS bandwidth candidates.

In Option 2 (for the CSS of the ePDCCH mapped to the central PRBs), a one-to-one mapping can be defined between system Band Width (BW) and CSS Band Width (CBW), as illustrated in Table 2. Therefore, once the system BW is obtained by UE through the MIB information bits, UE can determine the corresponding CSS BW via the one-to-one mapping.

TABLE 2

| | System BW configuration (MIB on PBCH, units: RBs) | | | | | |
|---|---|---|---|---|---|---|
| | 6 | 15 | 25 | 50 | 75 | 100 |
| CSS BW configuration | BW1 | BW2 | BW3 | BW4 | BW5 | BW6 |

In Option 3 (for the CSS of the ePDCCH mapped to the central PRBs), after the PBCH CRC attachment, the CRC bits can be scrambled by the corresponding CSS BW configuration the sequence. One example is shown in Table 3 with the assumption that two CSS BW candidates are supported by the system. Option 3 may limit the number of the CSS BW, such as two or three CSS BW.

TABLE 3

| CSS bandwidth | PBCH CRC mask |
|---|---|
| BW1 | 1110100000100001 |
| BW2 | 1001011111100000 |

Figure 11:
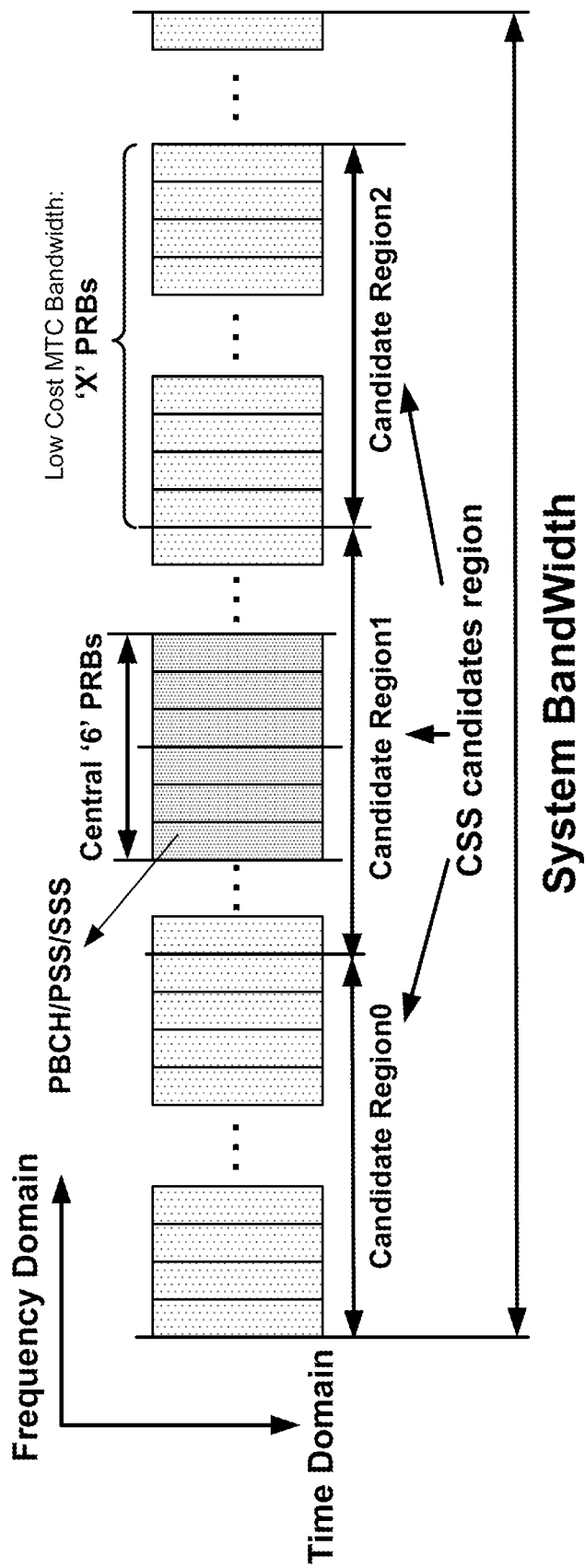
FIG. 11 illustrates a diagram of resource mapping for common search space (CSS) of enhanced physical downlink control channels (ePDCCH) using a plurality of candidate regions in accordance with an example.

In a second alternative, as illustrated in FIG. 11, a region index for a CSS transmission can be fixed, predefined, and/or specified in a specification (e.g., LTE specification). For example, a first candidate region (e.g., Candidate Region 0) at the bandwidth edge can be used for the CSS transmission. Additionally, the CSS regions can be configurable among neighboring cells to enable the enhanced inter-cell interference coordination (eICIC) on the CSS. A central predefined or fixed PRBs (e.g., central 6 PRBs in the frequency domain) can be included in one of the CSS regions (e.g., Candidate Region 1), where the central predefined or fixed PRBs include the PBCH, PSS, and/or SSS. The CSS candidate region can have a size less than or equal to a machine type communication (MTC) device bandwidth (e.g., 'X' PRBs or Candidate Region 2). If multiple candidate regions are used, at least two methods (or options) can be used to indicate the CSS BW region configuration for each cell.

In Option 1 (using multiple candidate regions), the CSS configuration relevant information (e.g., CSS region index and PRB numbers of each CSS region) can be carried by an IE (e.g., CSSRegion-Bandwidth or CSSRegion-Index) in the MIB via RRC signaling.

FIG. 12 illustrates an example abstract syntax notation one (ASN.1) code for a master information block (MIB) including an information element (IE) CSSRegion-Bandwidth and IE CSSRegion-Index. The MasterInformationBlock field description for CSSRegion-Bandwidth IE (or CSS-Bandwidth IE) can include parameters: Transmission bandwidth of each CSS region, and total of 'K' size CSS bandwidth candidates. The MasterInformationBlock field description for CSSRegion-Index IE can include parameters: CSS region index for an associated cell, L is the total CSS candidate region number depending on the system bandwidth and CSS-Bandwidth of the associated cell.

For Option 1 (using multiple candidate regions), a one-to-one mapping relationship can be similarly predefined between the system BandWidth (BW) and the CSS BandWidth (CBW), as shown in Table 2. In cases with a one-to-one mapping relationship between the BW and the CBW, the CSSRegion-Index IE may be transmitted in the MIB without the CSSRegion-Bandwidth IE (or CSS-Bandwidth IE).

Figure 13:
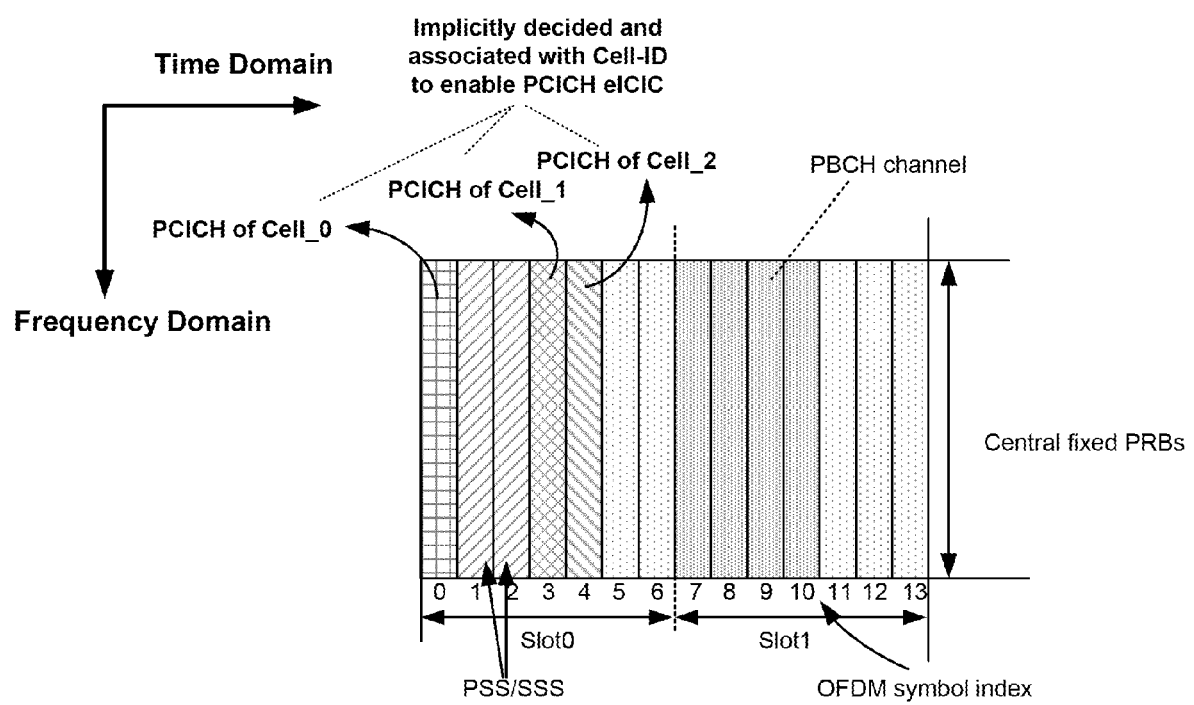
FIG. 13 illustrates a diagram of physical common search space indicator channel (PCICH) resource mapping associated with cell-identifiers (cell-ID) in accordance with an example.

In Option 2 (using multiple candidate regions), a different physical channel, which can be referred to as a Physical Common search space Indicator Channel (PCICH), can be specially designed to indicate the CSS region index and the CSS bandwidth information. Although the PCICH is used, any physical channel providing the CSS region index and/or the CSS bandwidth information is contemplated. The PCICH can be transmitted on a same set of antenna ports as the PBCH, with either transmit diversity or random beamforming, if more than one antenna port is used. The PCICH can be transmitted at a central fixed number of PRBs (e.g., the central 6 PRBs in the frequency domain) and can be time division multiplexed (TDMed) with the PBCH, PSS, and/or SSS, as shown in FIG. 13. FIG. 13 illustrates a PCICH channel resource mapping associated with cell identifier (Cell-ID). In order to avoid interference with PCICH information from neighboring cell, a cell-specific symbol offset can be applied to the PCICH resources mapping as shown in FIG. 13. Each PCICH (e.g., PCICH of Cell_0, PCICH of Cell_1, or PCICH of Cell_2) can be implicitly determined and associated with the Cell-ID to enable PCICH eICIC. In another configuration (not shown), the PCICH can be mapped to a cell-edge PRBs within one CSS candidate region.

Second Advantageous Effect(s)

The various methods, mechanism, or alternatives can be used to indicate (e.g., location or size) the CSS of the ePDCCH for the stand-alone carrier type (e.g., NCT). In an example, the CSS design can support the narrow-bandwidth operation for low cost machine type communication (MTC) devices/UEs, which can be taken into account to enable MTC devices/UEs to operate on the stand-alone carrier type.

Figure 14:
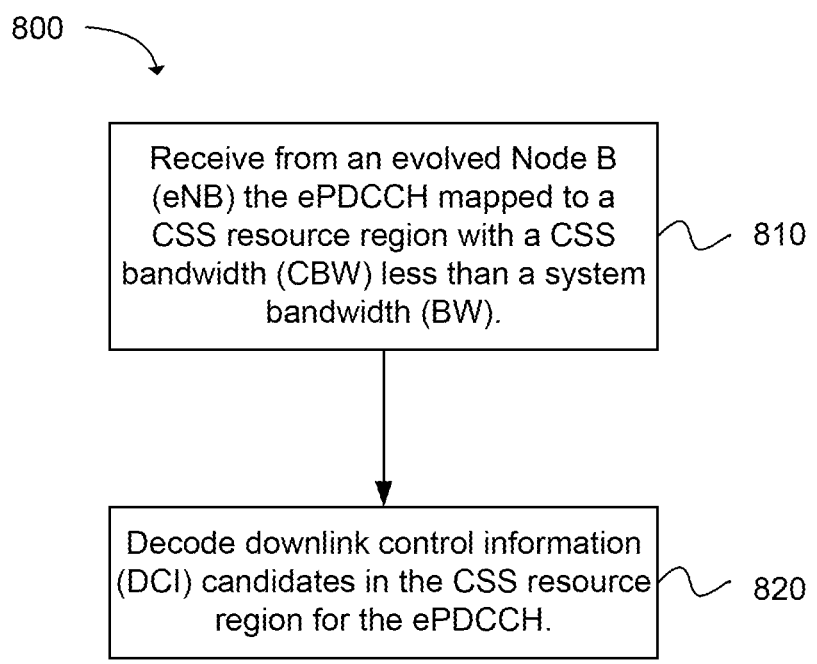
FIG. 14 depicts a flow chart of computer circuitry configured to perform a method for determining a location and a size of a common search space (CSS) of an enhanced physical downlink control channel (ePDCCH) for a stand-alone carrier in accordance with an example.

Another example provides a method 800 for determining a location and a size of a common search space (CSS) of an enhanced physical downlink control channel (ePDCCH) for a stand-alone carrier, as shown in the flow chart in FIG. 14. The method may be executed as instructions on a machine or computer circuitry, where the instructions are included on at least one computer readable medium or one non-transitory machine readable storage medium. A user equipment (UE) for determining a location and a size of a common search space (CSS) of an enhanced physical downlink control channel (ePDCCH) for a stand-alone carrier can have computer circuitry to perform the method 800. The computer circuitry can be configured to receive from an evolved Node B (eNB) the ePDCCH mapped to a CSS resource region with a CSS bandwidth (CBW) less than a system bandwidth (BW), as in block 810. The computer circuitry can be further configured to decode downlink control information (DCI) candidates in the CSS resource region for the ePDCCH, as in block 820.

The CSS resource region can be mapped to a central number of M of physical resource blocks (PRBs) including the central direct current (DC) subcarrier in a frequency domain. A start symbol of the CSS resource region can be the first orthogonal frequency-division multiplexing (OFDM) symbol of a first slot in a subframe, an end symbol of the CSS resource region can be the last OFDM symbol in the subframe, a CSS PRB size can be a number of PRBs in the frequency domain for the CSS resource region, and the CSS PRB size can be a fixed value or indicated through a physical layer channel.

In another example, the computer circuitry can be further configured to receive from the evolved Node B (eNB) a CSS indicator of the CSS resource region of the ePDCCH. The CSS indicator can include a CSS bandwidth indication carried in an information element (IE) in a master information block (MIB) on a physical broadcast channel (PBCH).

In another configuration, the computer circuitry can be further configured to receive from the evolved Node B (eNB) a CSS indicator of the CSS resource region of the ePDCCH. The CSS indicator can include a downlink system bandwidth indication carried in an information element (IE) in a master information block (MIB) on a physical broadcast channel (PBCH), and a downlink system bandwidth has a predefined one-to-one mapping to a CSS bandwidth.

In another example, the computer circuitry configured to decode the DCI candidates in the CSS resource region for the ePDCCH can be further configured to descramble CSS bandwidth candidates with a cyclic redundancy check (CRC) mask specified for a CSS bandwidth. Each CSS bandwidth can use a unique CRC mask.

In another configuration, the computer circuitry can be further configured to receive from the evolved Node B (eNB) a CSS indicator of the CSS resource region of the ePDCCH. The system bandwidth (BW) can include a plurality of CSS candidate regions in the CSS resource region in the frequency domain, and each CSS candidate region can be indicated by a CSS region index. The CSS region index can be carried in an information element (IE) in a master information block (MIB) using radio resource control (RRC) signaling. In an example, a downlink system bandwidth can have a predefined one-to-one mapping to a CSS bandwidth.

In another example, the CSS indicator can include a physical common search space indicator channel (PCICH) including the CSS region index and the CSS bandwidth information received on a same set of antenna ports as a physical broadcast channel (PBCH), and each PCICH for a cell can use a cell-specific symbol offset.

In another configuration, the CBW can be greater than or equal to six PRBs in the frequency domain. When the system bandwidth equals 6 PRBs (e.g., 1.4 MHz), a CBW can be equal to the system bandwidth in the frequency domain. In another example, the stand-alone carrier type can be a new carrier type (NCT) without a legacy physical downlink control channel (PDCCH).

In another configuration, the UE includes at least one of an antenna, a touch sensitive display screen, a speaker, a microphone, a graphics processor, an application processor, internal memory, and a non-volatile memory port, as shown in FIG. 7.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) configured for determining a common search space (CSS) from a physical resource block (PRB) indication for a stand-alone carrier type, comprising:
    a processing module to:
        determine a PRB set in the CSS from an enhanced physical hybrid automatic repeat request (ARQ) indicator channel (ePHICH) configuration information in a master information block (MIB), wherein the ePHICH configuration information includes 3 bits, wherein at least 1 bit is used to indicate one or more PRB region candidates and at least 1 bit is used to indicate one or more ePHICH resource configurations; and
        decode an enhanced physical downlink control channel (ePDCCH) or the ePHICH from PRB region candidates in the PRB set.

2. The UE of claim 1, further comprising:
    a transceiver module to:
    receive the MIB including the ePHICH configuration information from a node,
        wherein the node is selected from the group consisting of a base station (BS), a Node B (NB), an evolved Node B (eNB), a baseband unit (BBU), a remote radio head (RRH), a remote radio equipment (RRE), a remote radio unit (RRU), a central processing module (CPM), and combinations thereof.

3. The UE of claim 1, wherein the stand-alone carrier type is a new carrier type (NCT) without a legacy physical downlink control channel (PDCCH).

4. The UE of claim 1, wherein the ePHICH configuration information includes 3 bits, wherein 1 bit is used to indicate two PRB region candidates, and 2 bits are used to indicate up to four ePHICH resource configurations, wherein an ePHICH resource configuration is a multiple of an NPHICH and the NPHICH is a parameter related to a system bandwidth.

5. The UE of claim 4, wherein an ePHICH transmission can be implicitly indicated by the 3 ePHICH configuration information bits, and an ePHICH PRB begins from a specified PRB prior to a last PRB for the CSS of the ePDCCH indicated by the ePHICH configuration information bits.

6. The UE of claim 1, wherein the ePHICH configuration information includes 3 bits, wherein 2 bits are used to indicate four PRB region candidates, and 1 bit is used to indicate up to two ePHICH resource configurations, wherein an ePHICH resource configuration is a multiple of an NPHICH and the NPHICH is a parameter related to a system bandwidth.

7. The UE of claim 1, wherein the UE includes at least one of an antenna, a touch sensitive display screen, a speaker, a microphone, a graphics processor, an application processor, internal memory, a non-volatile memory port, and combinations thereof.

8. A user equipment (UE) to determine a location and a size of a common search space (CSS) of an enhanced physical downlink control channel (ePDCCH) for a stand-alone carrier, having computer circuitry configured to:
    receive from an evolved Node B (eNB) the ePDCCH mapped to a CSS resource region with a CSS bandwidth (CBW) less than a system bandwidth (BW), wherein the CSS resource region is mapped to a central number of M of physical resource blocks (PRBs) including a central direct current (DC) subcarrier in a frequency domain; and
    decode downlink control information (DCI) candidates in the CSS resource region for the ePDCCH.

9. The computer circuitry of claim 8, wherein a start symbol of the CSS resource region is the first orthogonal frequency-division multiplexing (OFDM) symbol of a first slot in a subframe, an end symbol of the CSS resource region is the last OFDM symbol in the subframe, a CSS PRB size is a number of PRBs in the frequency domain for the CSS resource region, and the CSS PRB size is a fixed value or indicated through a physical layer channel.

10. The computer circuitry of claim 8, wherein the computer circuitry is further configured to:
    receive from the evolved Node B (eNB) a CSS indicator of the CSS resource region of the ePDCCH, wherein the CSS indicator includes a CSS bandwidth indication carried in an information element (IE) in a master information block (MIB) on a physical broadcast channel (PBCH).

11. The computer circuitry of claim 8, wherein the computer circuitry is further configured to:
    receive from the evolved Node B (eNB) a CSS indicator of the CSS resource region of the ePDCCH, wherein the CSS indicator includes a downlink system bandwidth indication carried in an information element (IE) in a master information block (MIB) on a physical broadcast channel (PBCH), and a downlink system bandwidth has a predefined one-to-one mapping to a CSS bandwidth.

12. The computer circuitry of claim 8, wherein the computer circuitry configured to decode the DCI candidates in the CSS resource region for the ePDCCH is further configured to:
descramble CSS bandwidth candidates with a cyclic redundancy check (CRC) mask specified for a CSS bandwidth, wherein each CSS bandwidth uses a unique CRC mask.

13. A user equipment (UE) to determine a location and a size of a common search space (CSS) of an enhanced physical downlink control channel (ePDCCH) for a stand-alone carrier, having computer circuitry configured to:
receive from an evolved Node B (eNB) the ePDCCH mapped to a CSS resource region with a CSS bandwidth (CBW) less than a system bandwidth (BW);
receive from the evolved Node B (eNB) a CSS indicator of the CSS resource region of the ePDCCH, wherein the system bandwidth (BW) includes a plurality of CSS candidate regions in the CSS resource region in the frequency domain, wherein each CSS candidate region is indicated by a CSS region index; and
decode downlink control information (DCI) candidates in the CSS resource region for the ePDCCH.

14. The computer circuitry of claim 13, wherein the CSS region index is carried in an information element (IE) in a master information block (MIB) using radio resource control (RRC) signaling.

15. The computer circuitry of claim 14, wherein a downlink system bandwidth has a predefined one-to-one mapping to a CSS bandwidth.

16. The computer circuitry of claim 13, wherein the CSS indicator includes a physical common search space indicator channel (PCICH) including the CSS region index and CSS bandwidth information received on a same set of antenna ports as a physical broadcast channel (PBCH), wherein each PCICH for a cell uses a cell-specific symbol offset.

17. The computer circuitry of claim 8, wherein the CBW is greater than or equal to six PRBs in the frequency domain.

18. The computer circuitry of claim 8, wherein the CBW is less than or equal to a machine type communication (MTC) device bandwidth.

19. The computer circuitry of claim 8, wherein the stand-alone carrier type is a new carrier type (NCT) without a legacy physical downlink control channel (PDCCH).

20. The computer circuitry of claim 8, wherein the UE includes at least one of an antenna, a touch sensitive display screen, a speaker, a microphone, a graphics processor, an application processor, internal memory, a non-volatile memory port, and combinations thereof.

21. The computer circuitry of claim 13, wherein the CBW is greater than or equal to six PRBs in the frequency domain.

22. The computer circuitry of claim 13, wherein the CBW is less than or equal to a machine type communication (MTC) device bandwidth.

23. The computer circuitry of claim 13, wherein the stand-alone carrier type is a new carrier type (NCT) without a legacy physical downlink control channel (PDCCH).

24. The computer circuitry of claim 13, wherein the UE includes at least one of an antenna, a touch sensitive display screen, a speaker, a microphone, a graphics processor, an application processor, internal memory, a non-volatile memory port, and combinations thereof.

* * * * *